US009008903B2

(12) United States Patent
Kurata et al.

(10) Patent No.: US 9,008,903 B2
(45) Date of Patent: Apr. 14, 2015

(54) WHEEL DIAMETER VARIATION-DETECTING DEVICE

(75) Inventors: Takeshi Kurata, Saitama-ken (JP);
Takahiro Eguchi, Saitama-ken (JP);
Shuichi Fujimoto, Saitama-ken (JP);
Hirohiko Totsuka, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 1028 days.

(21) Appl. No.: 12/595,195

(22) PCT Filed: May 12, 2008

(86) PCT No.: PCT/JP2008/058738
§ 371 (c)(1),
(2), (4) Date: Oct. 8, 2009

(87) PCT Pub. No.: WO2008/146595
PCT Pub. Date: Dec. 4, 2008

(65) Prior Publication Data
US 2010/0114428 A1     May 6, 2010

(30) Foreign Application Priority Data
Jun. 1, 2007   (JP) ................................ 2007-146921

(51) Int. Cl.
*G01M 17/02*     (2006.01)
*B60C 23/00*     (2006.01)
(Continued)

(52) U.S. Cl.
CPC .......... *G01M 17/013* (2013.01); *B60T 2240/08* (2013.01); *B60W 40/1005* (2013.01); *B60W 40/105* (2013.01); *G01M 17/02* (2013.01)

(58) Field of Classification Search
CPC .............. B60W 30/02; B60W 30/045; B60W 30/18145; B60W 40/101; B60W 40/12; B60W 40/13; B60T 8/17551; B60R 16/0232
USPC ........ 701/1, 36, 70, 72, 75, 69; 702/145, 148, 702/157; 73/146; 340/438, 442–445
See application file for complete search history.

(56) References Cited

U.S. PATENT DOCUMENTS 4,777,611 A * 10/1988 Tashiro et al. ................ 702/148
4,825,368 A *  4/1989 Itoh et al. ........................ 701/69
(Continued)

FOREIGN PATENT DOCUMENTS

EP      0 508 146 A2    10/1992
EP      1 752 317 A2     2/2007
(Continued)

*Primary Examiner* — Jack W Keith
*Assistant Examiner* — Chuong P Nguyen
(74) *Attorney, Agent, or Firm* — Squire Patton Boggs (US) LLP

(57) ABSTRACT

The present disclosure presents a wheel diameter variation-detecting device capable of properly detecting relative variation in diameter between a plurality of wheels of a vehicle. The wheel diameter variation-detecting device can detect variation in diameter between a plurality of wheels of a vehicle, can detect rotational speeds of the respective wheels, and can calculate a variation parameter indicative of variation in diameter between the wheels using one of the wheels as a reference wheel, based on a result of comparison between the rotational speed of the reference wheel and that of one of the wheels other than the reference wheel. Further, the wheel diameter variation-detecting device can learn the variation parameter based on a value obtained by averaging a plurality of values of the variation parameter obtained before the detected travelled distance reaches a predetermined distance.

5 Claims, 5 Drawing Sheets

(51) Int. Cl.
*G01M 17/013* (2006.01)
*B60W 40/10* (2012.01)
*B60W 40/105* (2012.01)

(56) References Cited

U.S. PATENT DOCUMENTS

| | | | |
|---|---|---|---|
| 5,292,184 A * | 3/1994 | Takata | 303/147 |
| 5,546,308 A * | 8/1996 | Yamamoto | 701/93 |
| 5,699,251 A * | 12/1997 | Mori et al. | 701/97 |
| 5,771,479 A | 6/1998 | Yamamoto et al. | |
| 5,847,645 A * | 12/1998 | Boesch | 340/442 |
| 5,929,329 A | 7/1999 | Burkhard et al. | |
| 6,076,035 A * | 6/2000 | Yanase | 701/80 |
| 6,313,742 B1 * | 11/2001 | Larson | 340/442 |
| 6,439,045 B1 * | 8/2002 | Latarnik et al. | 73/146.5 |
| 6,940,399 B2 * | 9/2005 | Tominaga et al. | 340/444 |
| 7,301,446 B2 * | 11/2007 | Ray et al. | 340/444 |
| 2002/0036567 A1 * | 3/2002 | Larson | 340/442 |
| 2005/0113992 A1 * | 5/2005 | Kitano | 701/29 |
| 2005/0126274 A1 * | 6/2005 | Griesser et al. | 73/146 |
| 2007/0283750 A1 * | 12/2007 | Griesser et al. | 73/146 |
| 2009/0071227 A1 * | 3/2009 | Schmid et al. | 73/1.79 |
| 2010/0191399 A1 * | 7/2010 | Kono et al. | 701/22 |

FOREIGN PATENT DOCUMENTS

| | | | | |
|---|---|---|---|---|
| JP | 04-283665 A | | 10/1992 | |
| JP | 07-156621 A | | 6/1995 | |
| JP | 07-156621 A | | 6/1995 | |
| JP | 10-054295 A | | 2/1998 | |
| JP | 2003104079 A * | | 4/2003 | B60K 17/344 |
| JP | 2005-008111 A | | 1/2005 | |
| JP | 2005008111 A * | | 1/2005 | B60C 19/00 |
| JP | 2006-240402 A | | 9/2006 | |
| JP | 2006240402 A * | | 9/2006 | B60K 17/348 |
| WO | WO 03/086789 A1 | | 10/2003 | |

* cited by examiner

WHEEL DIAMETER VARIATION-DETECTING DEVICE

FIELD OF THE INVENTION

The present invention relates to a wheel diameter variation-detecting device for detecting variation in diameter between a plurality of vehicle wheels that rotate independently of each other.

BACKGROUND ART

In general, for use e.g. in controlling the behavior of a vehicle, respective rotational speeds of a plurality of wheels are calculated. More specifically, the angular speed of each wheel is detected by a sensor, and the wheel speed of each wheel is calculated based on the detected angular speed and a predetermined diameter of the wheel. However, the above-described method cannot accurately calculate the wheel speed when the actual diameter of the wheel is changed from the predetermined diameter due to aging thereof or there is a variation in the actual diameter between individual wheels. To solve this problem, conventionally, the diameters of the wheels are corrected. This method is disclosed e.g. in Patent Literature 1, in which, similarly to the above, the wheel speeds of the plurality of wheels are calculated, respectively, and an average value of the calculated wheel speeds of the respective wheels is calculated, whereafter based on the difference between the average value and the calculated wheel speeds of the respective wheels, the diameters of the wheels are corrected.

As described above, in the conventional method, the difference between the average value of the wheel speeds of the respective wheels and the calculated wheel speed of each wheel is used as a parameter indicative of a change in diameter of the wheel. However, the average value of the wheel speeds of the wheels is obtained by generally averaging all the wheel speeds, and hence the difference between the average value thus obtained and the calculated wheel speed of each wheel cannot directly represent relative variation in diameter between wheels, which makes it impossible to properly detect the relative variation in diameter between the wheels.

The present invention has been made to provide a solution to the above-described problems, and an object thereof is to provide a wheel diameter variation-detecting device which is capable of properly detecting relative variation in diameter between a plurality of wheels of a vehicle.

[Patent Literature 1]
Japanese Laid-Open Patent Publication (Kokai) No. H04-283665

DISCLOSURE OF THE INVENTION

To attain the above object, the invention as claimed in claim 1 provides a wheel diameter variation-detecting device 1 for detecting variation in diameter between a plurality of wheels (left front wheel WFL, right front wheel WFR, left rear wheel WRL, right rear wheel WRR in the embodiment (the same applies hereinafter in this section)) of a vehicle V, the wheels rotating independently of each other, comprising wheel rotational speed sensors 11 that detect rotational speeds of the wheels (rotational speed of left front wheel NFL, rotational speed of right front wheel NFR, rotational speed of left rear wheel NRL, rotational speed of right rear wheel NRR), respectively, variation parameter-calculating means (ECU2, step 3) for calculating a variation parameter indicative of variation in diameter between the wheels (different tire diameter ratio RDR), using one of the wheels as a reference wheel (left rear wheel WRL), based on a result of comparison between a detected rotational speed of the reference wheel and a detected rotational speed of another wheel (right rear wheel WRR), travelled distance-detecting means (ECU2, step 2) for detecting a travelled distance of the vehicle V, and variation parameter-learning means (ECU2, steps 4, 31 to 33, 36, 44) for learning the variation parameter based on a value obtained by averaging a plurality of values of the variation parameter obtained before the detected travelled distance (travelled distance cumulative value DISSUM) reaches a predetermined distance (second predetermined distance DIS2).

According to this wheel diameter variation-detecting device, the wheel rotational speed sensor detects the respective rotational speeds of the wheels. Further, the variation parameter-calculating means calculates the variation parameter indicative of variation in diameter between the plurality of wheels, using one of the plurality of wheels as the reference wheel, based on the result of comparison between the detected rotational speed of the reference wheel and the detected rotational speed of the another wheel. Normally, during straightforward traveling of a vehicle, the speed of the reference wheel and that of the another wheel are equal to each other, and therefore when the diameters of the wheels are equal to each other, the rotational speeds thereof become equal to each other, whereas when the diameters of the wheels are different from each other, since the wheels rotate independently of each other, the rotational speeds thereof are different from each other. Therefore, by calculating the variation parameter as described above, it is possible to properly detect relative variation in diameter between the reference wheel and the another wheel.

Further, the variation parameter-learning means learns the variation parameter based on the value obtained by averaging a plurality of values of the variation parameter obtained before the detected travelled distance reaches the predetermined distance. Therefore, during calculation of the variation parameter, even when a relatively large wheel speed difference is temporarily caused between the reference wheel and the another wheel by turning of the vehicle or acceleration thereof, it is possible to properly learn and calculate the variation parameter while suppressing influence of such a temporary disturbance.

The invention as claimed in claim 2 is the wheel diameter variation-detecting device 1 as claimed in claim 1, wherein the variation parameter represents a ratio between the rotational speed of the reference wheel and the rotational speed of the another wheel.

With this arrangement, the ratio between the rotational speed of the reference wheel and that of the another wheel is calculated as the variation parameter. Differently e.g. from the difference between the rotational speed of the reference wheel and that of the another wheel, the ratio therebetween directly represents relative variation in diameter between the reference wheel and the another wheel irrespective of the magnitudes of the rotational speeds of the reference wheel and the another wheel. Therefore, by using the ratio between the rotational speed of the reference wheel and that of the another wheel as the variation parameter, it is possible to more properly detect variation in diameter between the wheels.

The invention as claimed in claim 3 is the wheel diameter variation-detecting device 1 as claimed in claim 1 or 2, wherein the wheels include left and right wheels, and the reference wheel is one of the left and right wheels and the another wheel is the other of the left and right wheels.

With this arrangement, since the variation parameter is calculated based on the result of comparison between the rotational speed of one of the left and right wheels and that of the other of the same, it is possible to properly detect relative variation in diameter between the left and right wheels. Therefore, when ones of the front and rear wheels are drive wheels and the others thereof are driven wheels, even if the actual speeds of the front wheels are made different from those of the rear wheels e.g. due to the acceleration of the vehicle V, it is possible to properly detect relative variation in diameter between the left and right wheels, without being adversely affected by the different speeds of the wheels. Further, this makes it possible to properly calculate the speed difference between the left and right wheels based on the detected relative variation in diameter between the left and right wheels, which makes it possible to accurately perform the calculation of lateral acceleration of the vehicle and cornering judgment, directly based on the result of the calculation of the speed difference.

The invention as claimed in claim 4 is the wheel diameter variation-detecting device 1 as claimed in claim 1, further comprising storage means (ECU2, steps 36, 44) for storing a learned value (learned value RDRG of the different tire diameter ratio) of the variation parameter, learned by the variation parameter-learning means, and the variation parameter-learning means calculates a provisional learned value (provisional value RDRGT) of the variation parameter (step 14), and determines both reliability of the provisional learned value and reliability of the stored learned value based on a result of comparison between the calculated provisional learned value and the learned value stored by the storage means (steps 17, 13, 18).

With this arrangement, the storage means stores the learned value of the variation parameter, and a provisional learned value of the variation parameter is calculated. Further, based on the result of comparison between the calculated provisional learned value and the stored learned value of the variation parameter (hereinafter referred to as "the stored learned value"), both the reliability of the provisional learned value and the reliability of the stored learned value are determined. The diameters of the wheels are not immediately changed unless the wheels are replaced, so that the provisional learned value and the stored learned value become approximately equal to each other, and hence it is possible to properly determine the reliability of the provisional learned value and that of the stored learned value based on the result of the comparison therebetween.

BEST MODE FOR CARRYING OUT THE INVENTION

The invention will now be described in detail with reference to the drawings showing preferred embodiment thereof.

Figure 1:
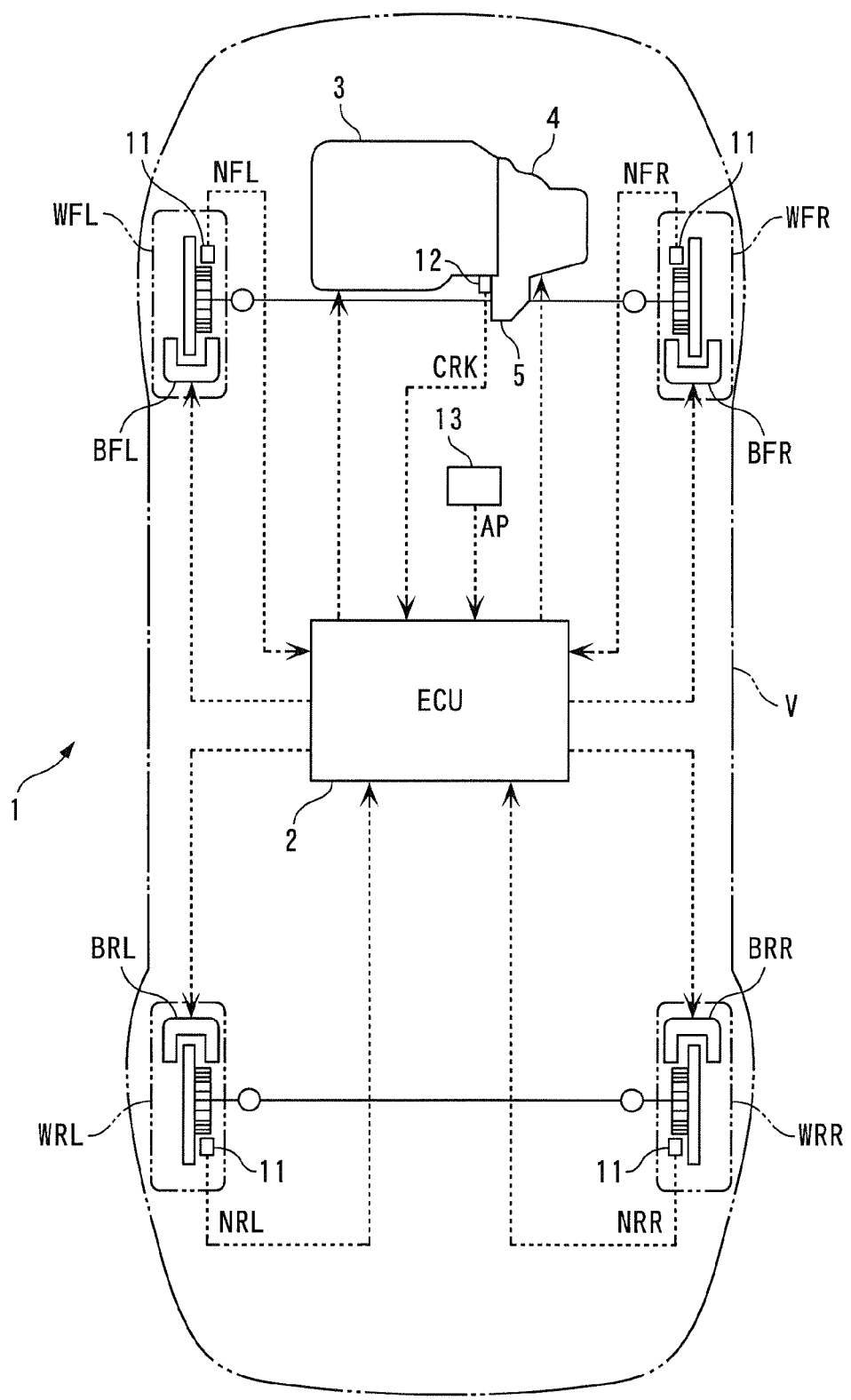
FIG. 1 A schematic diagram of a vehicle to which is applied a wheel diameter variation-detecting device according to an embodiment of the present invention.

FIG. 1 schematically shows a vehicle V to which is applied a wheel diameter variation-detecting device 1 according to an embodiment of the present invention. The vehicle V is a four-wheel vehicle that is equipped with left and right front wheels WFL and WFR and left and right rear wheels WRL and WRR (a reference wheel and another wheel), which rotate independently of each other, and has an engine 3 installed on a front part thereof. The engine 3 has a crankshaft (not shown) connected to the left and right front wheels WFL and WFR via an automatic transmission 4 and a differential 5. The left and right front wheels WFL and WFR and the left and right rear wheels WRL and WRR are provided with disc-type brakes BFL, BFR, BRL and BRR, respectively. The braking forces of BFL, BFR, BRL and BRR are controlled by an ECU 2, described hereinafter.

Further, the front wheels WFL and WFR and the rear wheels WRL and WRR are provided with magnetic pickup type wheel rotational speed sensors 11 (travelled distance-detecting means), respectively. The wheel rotational speed sensors 11 detect the rotational speeds NFL, NFR, NRL and NRR of the left and right front and rear wheels, and output signals indicative of the sensed wheel speeds NFL, NFR, NRL and NRR to the ECU 2, respectively. The ECU 2 calculates a vehicle speed VP e. g. based on the rotational speeds NRL and NRR of the left and right rear wheels.

Furthermore, a crank angle sensor 12 is provided on the crankshaft of the engine 3, for outputting a crank pulse signal CRK whenever the crankshaft rotates through a predetermined angle. The crank pulse signal CRK as well is delivered to the ECU 2. The ECU 2 calculates the rotational speed NE of the engine 3 (hereinafter referred to as "the engine speed NE") based on the crank pulse signal CRK. Further, an accelerator pedal opening sensor 13 detects the amount AP of operation (stepped-on amount) of an accelerator pedal, not shown (hereinafter referred to as "the accelerator pedal opening AP"), and delivers a signal indicative of the sensed accelerator pedal opening AP to the ECU 2.

The ECU 2 (variation parameter-calculating means, travelled distance-detecting means, variation parameter-learning means, and storage means) is implemented by a microcomputer comprised of an I/O interface, a CPU, a RAM, a ROM and an EEPROM, and controls the respective operations of the engine 3, the automatic transmission 4, and the brakes BFL, BFR, BRL and BRR, in response to the signals from the aforementioned sensors 11 to 13.

Further, to detect relative variation in tire diameter between the left and right rear wheels WRL and WRR, the ECU 2 calculates a different tire diameter ratio RDR, which is a ratio between the tire diameter of the right rear wheel WRR and that of the left rear wheel WRL, and calculates a learned value RDRG of the different tire diameter ratio by learning the calculated different tire diameter ratio RDR. The calculation process of the learned value RDRG will be described hereinafter. In the present embodiment, the different tire diameter ratio RDR corresponds to a variation parameter.

Furthermore, the ECU 2 calculates the wheel speed difference DVW between the left rear wheel WRL and the right rear wheel WRR, using the calculated learned value RDRG of the different tire diameter ratio, by the following equation (1):

$$DVW = TRREF \cdot NRL - TRREF \cdot RDRG \cdot NRR \qquad (1)$$

wherein TRREF represents a value obtained by multiplying a predetermined reference tire diameter (e.g. 30 cm) by $2\pi$. Further, based on the calculated wheel speed difference DVW, the ECU 2 performs cornering judgment for judging whether or not the vehicle V is cornering, and calculates a lateral acceleration of the vehicle V. During cornering, the ECU 2 controls the lateral acceleration by controlling the engine speed NE and the braking forces of the brakes BFL, BFR, BRL and BRR, according to the calculated lateral acceleration (hereinafter, this control operation will be referred to as "the cornering G control").

Figure 2:
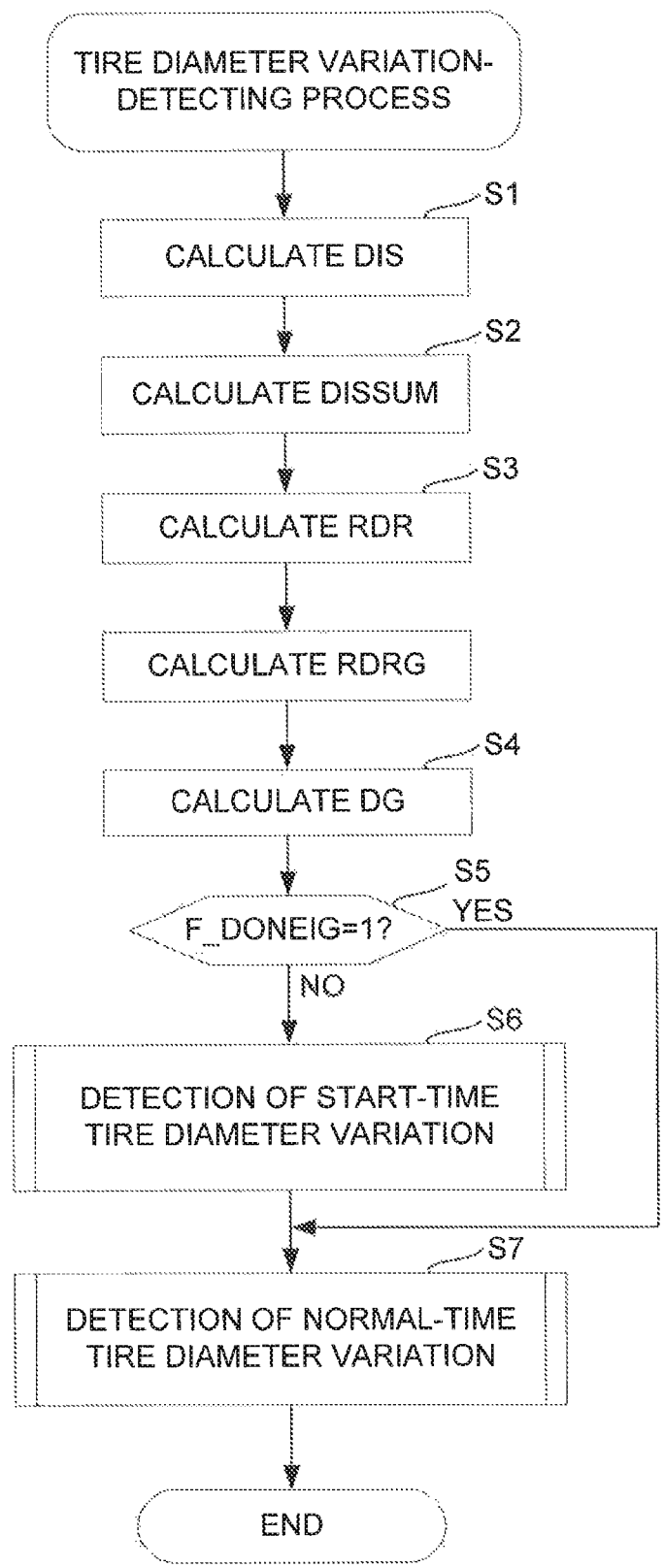
FIG. 2 A flowchart of a tire diameter variation-detecting process.

Next, a tire diameter variation-detecting process for calculating the above-described learned value RDRG of the different tire diameter ratio will be described with reference to FIG. 2. This process is executed during operation of the engine 3 whenever a predetermined time period T (e.g. 10 msec) elapses. First, in a step 1 (shown as S1 in abbreviated form in FIG. 2; the following steps are also shown in abbreviated form), a travelled distance DIS is calculated by multiplying the vehicle speed VP by the predetermined time period T. Next, a travelled distance cumulative value DISSUM (travelled distance of the vehicle) is calculated by adding the travelled distance DIS calculated in the step 1 to the immediately preceding value DISSUMZ thereof (step 2). It should be noted that the travelled distance cumulative value DISSUM is reset to 0 at the start of the engine 3.

Then, the different tire diameter ratio RDR is calculated by dividing the right-rear wheel speed NRR by the left-rear wheel speed NRL (step 3). Next, the difference between the calculated different tire diameter ratio RDR and a stored latest value RDRG(n) of the learned value of the different tire diameter ratio is calculated as a different tire diameter ratio difference DG (step 4). Hereinafter, the latest value of stored data is indicated by adding a subscript (n), and data stored k times earlier than the latest one by adding a subscript (n-k), as deemed appropriate. It should be noted that in the step 4, when the learned value RDRG of the different tire diameter ratio has not been calculated, e.g. at the time of factory shipping of the vehicle or immediately after battery replacement, a predetermined value (e.g. 1.0) is used as an initial value of RDRG.

Next, it is determined whether or not an initial learning flag F_DONEIG is equal to 1 (step 5). The initial learning flag F_DONEIG is set to 1 when a provisional value RDRGT, referred to hereinafter, of the learned value RDRG of the different tire diameter ratio is calculated, and is reset to 0 at the start of the engine 3. If the answer to the question of the step 5 is negative (NO), i.e. if the provisional value RDRGT has not been calculated yet after the start of the engine 3, a start-time tire diameter variation-detecting process is executed (step 6), and then a normal-time tire diameter variation-detecting process is executed (step 7), followed by terminating the present process. On the other hand, if the answer to the question of the step 5 is affirmative (YES), i.e. if the provisional value RDRGT has been calculated, the step 6 is skipped and the process proceeds to the step 7 to execute the normal-time tire diameter variation-detecting process, followed by terminating the present process. More specifically, the start-time tire diameter variation-detecting process is not carried out after the provisional value RDRGT has been calculated after the start of the engine 3.

Figure 3:
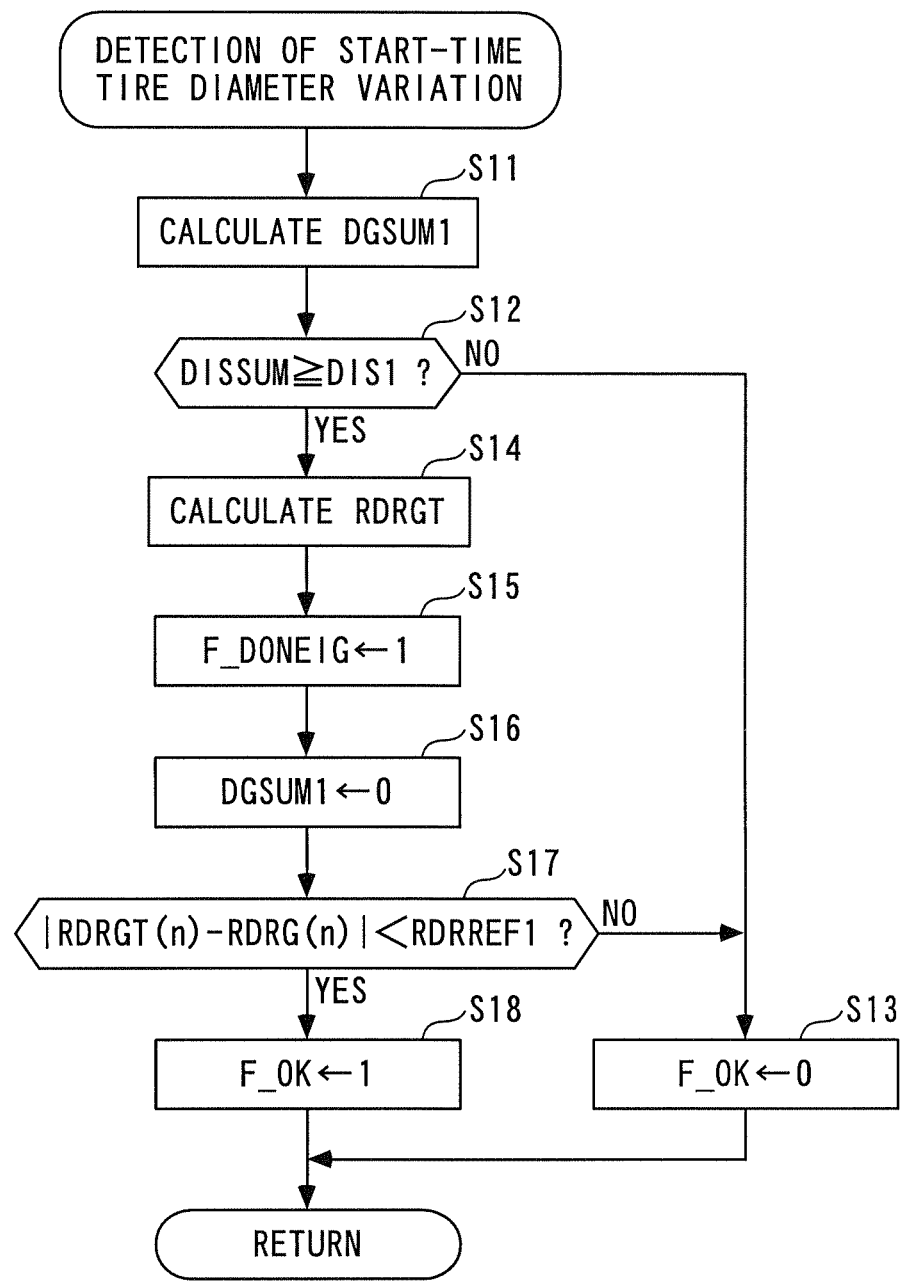
FIG. 3 A flowchart showing a subroutine of a start-time tire diameter variation-detecting process executed in a step 6 in FIG. 2.

FIG. 3 shows the start-time tire diameter variation-detecting process executed in the step 6. In the present process, reliability of the learned value RDRG of the different tire diameter ratio is determined based on the provisional value RDRGT calculated by learning the different tire diameter ratio RDR calculated in the step 3, and according to the result of the determination, the above-mentioned cornering judgment and permission or inhibition of cornering G control are carried out.

First, in a step 11, a first difference cumulative value DGSUM1 is calculated using the immediately preceding value DGSUM1Z of the first difference cumulative value, the travelled distance DIS calculated in the step 1, and the different tire diameter ratio difference DG calculated in the step 4, by the following equation (2):

$$DGSUM1 = DGSUM1Z + (DG \cdot DIS/DIS1) \quad (2)$$

wherein DIS1 represents a first predetermined distance (e.g. 1 km). It should be noted that the first difference cumulative value DGSUM1 is reset to 0 at the start of the engine 3.

Next, it is determined whether or not the travelled distance cumulative value DISSUM calculated in the step 2 is not smaller than the first predetermined distance DIS1 (step 12). If the answer to this question is negative (NO), it is judged that the different tire diameter ratio RDR has not been sufficiently learned, and a permission flag F_OK is set to 0 without calculating the provisional value RDRGT (step 13), followed by terminating the present process. It should be noted that the permission flag F_OK is reset to 0 at the start of the engine 3.

When the permission flag F_OK is set to 0 as described above, the cornering judgment and the cornering G control are inhibited. This is for the following reason: In such an event, since the provisional value RDRGT is not calculated, it is impossible to determine the reliability of the stored learned value RDRG of the different tire diameter ratio, and hence the cornering judgment and the cornering G control are inhibited so as to prevent the cornering judgment and the cornering G control from being executed using the learned value RDRG reliability of which is uncertain.

On the other hand, if the answer to the question of the step 12 is affirmative (YES), i.e. if the travelled distance cumulative value DISSUM has reached the first predetermined distance DIS1, it is judged that the different tire diameter ratio RDR has been sufficiently learned, and the first difference cumulative value DGSUM1 calculated in the step 11 is added to the latest value RDRG(n) of the learned value of the different tire diameter ratio, whereby the provisional value RDRGT is calculated (step 14). The calculated provisional value RDRGT is stored as the latest value RDRGT(n) thereof. Then, to indicate that the provisional value RDRGT has been calculated, the initial learning flag F_DONEIG is set to 1 (step 15), and the first difference cumulative value DGSUM1 is reset to 0 (step 16).

Next, it is determined whether or not the absolute value (|RDRGT(n)−RDRG(n)|) of the difference between the provisional value RDRGT(n) calculated in the step 14 and a learned value RDRG(n) of the different tire diameter ratio is smaller than a first predetermined value RDRREF1 (step 17). The first predetermined value RDRREF1 is set to e.g. 0.5% of the learned value RDRG(n) of the different tire diameter ratio. If the answer to the question of the step 17 is negative (NO), i.e. if the difference between the provisional value RDRGT and the learned value RDRG of the different tire diameter ratio is relatively large, it is regarded that RDRGT and RDRG are low in reliability, and the step 13 is executed, followed by terminating the present process.

The reason why the learned value RDRG of the different tire diameter ratio is regarded to be low in reliability in such a case is as follows: For example, when the tire of the left rear wheel WRL or the right rear wheel WRR is replaced during a stop of the engine 3, the diameter of a tire in a brand-new condition after the replacement is larger than that of a worn-out tire used before the replacement, and hence the actual different tire diameter ratio RDR is different between before and after the replacement. This can be the cause of the answer to the question of the step 17 being negative (NO), and in such a case, the learned value RDRG of the different tire diameter ratio, calculated during the immediately preceding operation of the engine 3, does not properly represent the actual different tire diameter ratio RDR.

Further, not only the learned value RDRG of the different tire diameter ratio but also the provisional value RDRGT is regarded to be low in reliability since the provisional value RDRGT is calculated only once after the start of the engine 3, and further unless such a tire replacement as described above is performed, normally, the provisional value RDRGT and the learned value RDRG of the different tire diameter ratio become approximately equal to each other, since the diameters of tires are not immediately changed.

On the other hand, if the answer to the question of the step 17 is affirmative (YES), i.e. if the provisional value RDRGT and the learned value RDRG of the different tire diameter ratio are approximately equal to each other, both the values RDRGT and RDRG are regarded to be high in reliability, and it is judged that the cornering G control should be permitted, whereby the permission flag F_OK is set to 1 (step 18), followed by terminating the present process.

As described above, in the start-time tire diameter variation-detecting process, the different tire diameter ratio difference DG, which is the difference between the learned value RDRG(n) of the different tire diameter ratio and the current different tire diameter ratio RDR, is calculated until the travelled distance of the vehicle V reaches the first predetermined distance DIS1 (step 4), and then a plurality of calculated values of the different tire diameter ratio difference DG are averaged to thereby calculate the first difference cumulative value DGSUM1 (steps 11 and 12). Furthermore, the first difference cumulative value DGSUM1 is added to the learned value RDRG of the different tire diameter ratio, whereby the provisional value RDRGT is calculated (step 14). As described above, the provisional value RDRGT is calculated by averaging values of the different tire diameter ratio RDR calculated over the first predetermined distance DIS1, whereby even when a relatively large wheel speed difference between the left and right rear wheels WRL and WRR temporarily occurs e.g. by turning of the vehicle V, it is possible to properly calculate the provisional value RDRGT while suppressing influence of such a temporary disturbance. Further, since the reliability of the learned value RDRG of the different tire diameter ratio is determined based on the result of comparison between the thus calculated provisional value RDRGT and the learned value RDRG, it is possible to properly perform the determination.

Furthermore, in the above case, since the first predetermined distance DIS1 is smaller than a second predetermined distance DIS2, referred to hereinafter, it is possible to quickly determine the reliability of the learned value RDRG of the different tire diameter ratio using the above-described provisional value RDRGT, which makes it possible to quickly determine whether to permit or inhibit the cornering G control using the learned value RDRG or the like. It should be noted that in the start-time tire diameter variation-detecting process, when the learned value RDRG is not calculated, a predetermined value (e.g. 1.0) is used as the latest learned value RDRG(n) of the different tire diameter ratio.

Figure 4:
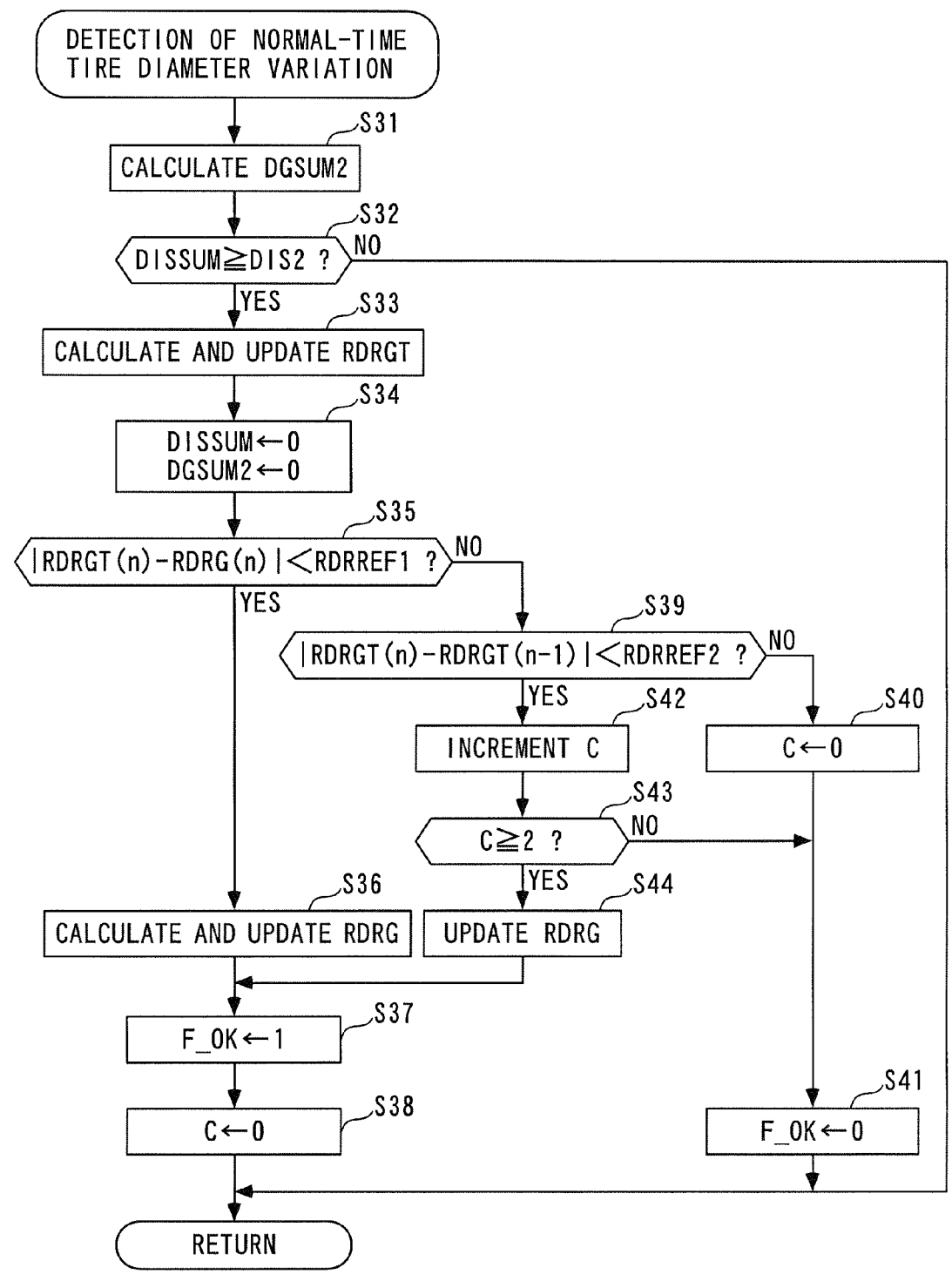
FIG. 4 A flowchart showing a subroutine of a normal-time tire diameter variation-detecting process executed in a step 7 in FIG. 2.

Next, the normal-time tire diameter variation-detecting process executed in the above-mentioned step 7 will be described with reference to FIG. 4. First, in a step 31, a second difference cumulative value DGSUM2 is calculated using the immediately preceding value DGSUM2Z of the second difference cumulative value, the travelled distance DIS calculated in the step 1, and the different tire diameter ratio difference DG calculated in the step 4, by the following equation (3):

$$DGSUM2 = DGSUM2Z + (DG \cdot DIS/DIS2) \tag{3}$$

wherein DIS2 represents a second predetermined distance which is set to a value, e.g. 2 km, which is larger than the first predetermined distance DIS1. It should be noted that the second difference cumulative value DGSUM2 is reset to 0 at the start of the engine 3.

Next, it is determined whether or not the travelled distance cumulative value DISSUM calculated in the step 2 is not smaller than the second predetermined distance DIS2 (step 32). If the answer to this question is negative (NO), similarly to the case of the step 12, it is judged that the different tire diameter ratio RDR has not been sufficiently learned, and the present process is immediately terminated. On the other hand, if the answer to the question of the step 32 is affirmative (YES), i.e. if the travelled distance cumulative value DISSUM has reached the second predetermined distance DIS2, the second difference cumulative value DGSUM2 calculated in the step 31 is added to the stored latest value RDRG(n) of the learned value of the different tire diameter ratio, whereby the provisional value RDRGT is calculated, and the calculated provisional value RDRGT is stored as the latest value RDRGT(n) thereof to update the provisional value RDRGT (step 33). Then, both the travelled distance cumulative value DISSUM and the second difference cumulative value DGSUM2 are reset to 0 (step 34).

Next, it is determined whether or not the absolute value (|RDRGT(n)−RDRG(n)|) of the difference between the provisional value RDRGT(n) calculated in the step 33 and the latest value RDRG(n) of the learned value of the different tire diameter ratio is smaller than the first predetermined value RDRREF1 (step 35).

If the answer to the question of the step 35 is affirmative (YES), i.e. if the provisional value RDRGT(n) and the learned value RDRG(n) of the different tire diameter ratio are approximately equal to each other, similarly to the case of the step 17, both the values RDRGT(n) and RDRG(n) are regarded to be high in reliability, and an average value of the provisional value RDRGT(n), the stored latest value RDRG(n) of the learned value of the different tire diameter ratio, and the immediately preceding value RDRG (n−1) thereof is calculated as the learned value RDRG of the different tire diameter ratio. The calculated learned value RDRG is stored in the EEPROM as the latest value RDRG(n) to update the learned value RDRG of the different tire diameter ratio (step 36). It should be noted in the steps 33, 35 and 36, when the learned value RDRG of the different tire diameter ratio has not been calculated, a predetermined value, e.g. 1.0 is used as the latest value RDRG(n) of the learned value of the different tire diameter ratio and the immediately preceding value RDRG (n−1) thereof.

Subsequently, based on the above-described determination that the learned value RDRG of the different tire diameter ratio is high in reliability, to permit the cornering G control and the like, the permission flag F_OK is set to 1 (step 37), and the counter value C of a permission counter is set to 0 (step 38), followed by terminating the present process.

On the other hand, If the answer to the question of the step 35 is negative (NO), i.e. if the difference between the provisional value RDRGT(n) and the learned value RDRG(n) of the different tire diameter ratio is relatively large, it is determined whether or not the absolute value (|RDRGT(n)−RDRGT(n−1)|) of the difference between the latest value RDRGT(n) of the provisional value and the immediately preceding value RDRGT(n−1) thereof is smaller than a second predetermined value RDRREF2 (step 39). The second predetermined value RDRREF2 is set to e.g. 0.5% of the immediately preceding value RDRGT(n−1).

If the answer to the question of the step 39 is negative (NO), the counter value C of the permission counter is reset to 0 (step 40). Then, since the answer to the question of the step 35 is negative (NO), i.e. the difference between the provisional value RDRGT and the learned value RDRG of the different tire diameter ratio is relatively large, both the values RDRGT and RDRG are regarded to be low in reliability, so that the update of the learned value RDRG is deferred, and to inhibit the cornering G control, the permission flag F_OK is set to 0 (step 41), followed by terminating the present process.

On the other hand, if the answer to the question of the step 39 is affirmative (YES), i.e. if the latest value RDRGT(n) and the immediately preceding value RDRGT(n−1) of the provisional value are approximately equal to each other, the counter value C of the permission counter is incremented (step 42), and it is determined whether or not the counter value C is not smaller than 2 (step 43). If the answer to this question is negative (NO), the above-described step 41 is carried out, followed by terminating the present process.

On the other hand, if the answer to the question of the step 43 is affirmative (YES), i.e. if both the difference between the second preceding value RDRGT(n−2) and the immediately preceding value RDRGT(n−1) of the provisional value, and the difference between the immediately preceding value RDRGT(n−1) and the latest value RDRGT(n) of the provisional value are small, substantially the same value is continuously obtained as the provisional value RDRGT a plurality of times, and hence they are regarded to be high in reliability. Then, the latest value RDRGT(n) to the second preceding value RDRGT(n−2) of the provisional value are set as the latest value RDRG(n) to the second preceding value RDRG(n−2) of the learned value of the different tire diameter ratio, and the latest value RDRG(n) to the second preceding value RDRG(n−2) thus set are stored in the EEPROM for update (step 44). Next, in accordance with the above determination, to permit the cornering G control, the step 37 is executed to set the permission flag F_OK 1 and the step 38 is executed, followed by terminating the present process.

Figure 5:
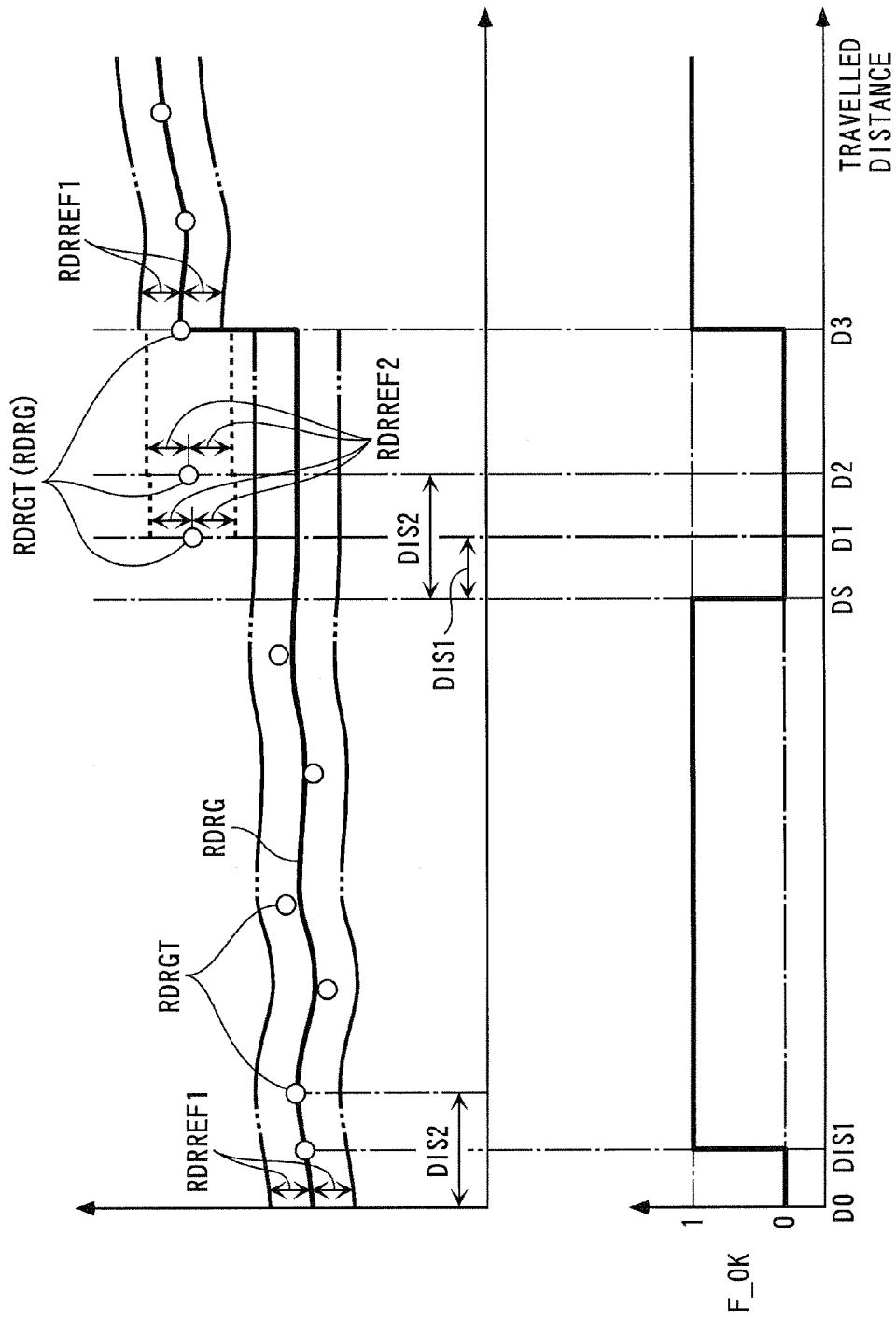
FIG. 5 A diagram showing an example of operation of the wheel diameter variation-detecting device.

FIG. 5 shows an example of operation of the above-described wheel diameter variation-detecting device 1. More specifically, FIG. 5 shows a case where a tire of one of the left and right rear wheels WRL and WRR is replaced by one having a different diameter on the way of traveling of the vehicle V.

After the start (travelled distance D0) of the engine 3, the start-time tire diameter variation-detecting process is carried out (step 6 in FIG. 2), and when the travelled distance has reached the first predetermined distance DIS1, the provisional value RDRGT is calculated (step 14 in FIG. 3). In a normal case where tire replacement is not carried out before the start of the engine 3, the calculated provisional value RDRGT and the learned value RDRG of the different tire diameter ratio become substantially equal to each other. Therefore, as indicated at the travelled distance DIS1, the absolute value of the difference between the provisional value RDRGT and the learned value RDRG of the different tire diameter ratio becomes smaller than the first predetermined value RDRREF1, so that the answer to the question of the step 17 becomes affirmative (YES). Accordingly, the permission flag F_OK, which was reset to 0 at the start of the engine 3, is set to 1 (step 18), whereby the cornering G control is permitted.

Further, after the start of the engine 3, the normal-time tire diameter variation-detecting process is executed in parallel with the start-time tire diameter variation-detecting process (step 7), and by executing the steps 2 and 32 to 34, the provisional value RDRGT is calculated and updated once every second predetermined distance DIS2. Normally, the diameter of a tire is not immediately changed, and hence the calculated provisional value RDRGT and the learned value RDRG of the different tire diameter ratio become approximately equal to each other. Therefore, as shown in a range from the travelled distances DIS1 to DS in FIG. 5, the absolute value of the difference between the provisional value RDRGT and the learned value RDRG of the different tire diameter ratio becomes smaller than the first predetermined value RDRREF1, whereby the answer to the question of the step 35 becomes affirmative (YES). Accordingly, the learned value RDRG is calculated using the provisional value RDRGT, and is updated (step 36), and the permission flag F_OK is set to 1 (step 37), thereby permitting the cornering G control.

Then, assuming that at a travelled distance DS, the vehicle V and the engine 3 are stopped, and a tire of one of the left and right rear wheels WRL and WRR is replaced by one having a different diameter, the start-time tire diameter variation-detecting process is carried out during traveling immediately after the replacement, whereby the provisional value RDRGT, a value of which is largely different from the latest value RDRG(n) of the learned value of the different tire diameter ratio at the time, is calculated at a travelled distance D1. As a result, the answer to the question of the step 17 becomes negative (NO), and accordingly the permission flag F_OK is set to 0 (step 13) to inhibit the cornering G control.

After that, the vehicle V continues to travel, and at travelled distances D2 and D3, the provisional value RDRGT is calculated as substantially the same value as calculated at the travelled distance D1, whereby the answers to the questions of the steps 39 and 43 become affirmative (YES). Accordingly, the latest value RDRGT(n) to the second preceding value RDRGT(n−2) of the provisional value, which are calculated according to the different tire diameter ratio RDR after the replacement of the tire, are set as the latest value RDRG(n) to the second preceding value RDRG(n−2) of the learned value of the different tire diameter ratio, and the learned value RDRG is updated (step 44). Further, the permission flag F_OK is set to 1 (step 37). Therefore, even after tire replacement is performed, it is possible to obtain an appropriate value of the learned value RDRG of the different tire diameter ratio, according to the diameter of an actual tire having replaced the older one. Further, it is to be understood that even when tire replacement is performed during operation of the engine 3, it is possible to obtain an appropriate value of the learned value RDRG of the different tire diameter ratio, according to the diameter of an actual tire having replaced the older one.

It should be noted that in the present embodiment, as is clear from the steps 35 and 36, when the update of the learned value RDRG of the different tire diameter ratio is deferred, the deferral of the update is canceled immediately after the absolute value of the difference between the provisional value RDRGT and the learned value RDRG of the different tire diameter ratio becomes smaller than the first predetermined value RDRREF1. Instead of this, the deferral of the update may be canceled e.g. when the state of |RDRGT−RDRG|<RDRREF1 continues a plurality of times. Further, although in the steps 39 and 43, the deferral of the update of the learned value RDRG is canceled based on the absolute value of the difference between the latest value RDRGT(n) and the immediately preceding value RDRGT(n−1) of the provisional value, this is not limitative, but the provisional value RDRGT calculated when the answer to the question of the step 35 is changed from YES to NO may be stored, and the deferral of the update may be canceled according to the absolute value of the difference between the stored provisional value RDRGT and the latest value RDRGT(n) of the provisional value calculated each time.

Furthermore, although the cornering G control or the like is inhibited when the difference between the provisional value RDRGT and the learned value RDRG of the different tire diameter ratio is large, this is not limitative, but, for example, the cornering G control may be inhibited when the absolute value of the difference therebetween is relatively large, and on the other hand, the cornering G control may be permitted while imposing some restriction when the absolute value is relatively small.

As described heretofore, according to the present embodiment, the different tire diameter ratio RDR is calculated as the variation parameter, and hence it is possible to more properly detect the variation in tire diameter between the left and right rear wheels WRL and WRR irrespective of the magnitudes of the left and right rear wheel rotational speeds NRL and NRR. Further, the different tire diameter ratio RDR is calculated using the left and right rear wheel rotational speeds NRL and NRR, so that even when the actual wheel speeds of the front wheels WFL and WFR are different from those of the rear wheels WRL and WRR e.g. due to the acceleration of the vehicle V, it is possible to properly detect relative variation in tire diameter between the left and right rear wheels WRL and WRR without being adversely affected by the difference in wheel speed between the front and rear wheels. Furthermore, the wheel speed difference DVW between the left and right rear wheels WRL and WRR is calculated according to the learned value RDRG of the different tire diameter ratio, which is the learned value of the different tire diameter ratio RDR between the tires of the left and right rear wheels WRL and WRR, so that it is possible to properly calculate the wheel speed difference DVW. Therefore, it is possible to accurately perform the cornering judgment and calculation of the lateral acceleration of the vehicle V using the wheel speed difference DVW, which in turn makes it possible to properly perform the cornering G control.

Further, the learned value RDRG of the different tire diameter ratio is calculated by learning the different tire diameter ratio RDR as follows: The different tire diameter ratio difference DG, which is the difference between the learned value RDRG(n) of the different tire diameter ratio and the current different tire diameter ratio RDR, is calculated until the travelled distance of the vehicle V reaches the second predetermined distance DIS2, and then a plurality of calculated values of the different tire diameter ratio difference DG are averaged to thereby calculate the second difference cumulative value DGSUM2 (step 31). Further, the learned value RDRG of the different tire diameter ratio is calculated based on the second difference cumulative value DGSUM2 (steps 33, 36 and 44). As described above, the learned value RDRG is calculated by averaging values of the different tire diameter ratio RDR over the second travelled distance (second predetermined distance) DIS2, so that even when a relatively large wheel speed difference is temporarily caused between the left and right rear wheels WRL and WRR e.g. by turning of the vehicle, it is possible to properly calculate the learned value RDRG of the different tire diameter ratio while suppressing the influence of such a temporary disturbance.

Furthermore, if the difference between the provisional value RDRGT(n) and the learned value RDRG(n) of the different tire diameter ratio is relatively large (NO to step 35), the update of the learned value RDRG is deferred, whereafter as soon as the provisional value RDRGT(n) and the learned value RDRG(n) have become substantially equal to each other (YES to step 35), the learned value RDRG is immediately calculated and updated (step 36). Therefore, even when turning of the vehicle V is performed over a long distance corresponding to the second travelled distance (second predetermined distance) DIS2 e.g. during traveling through an interchange or along a mountain road, causing a relatively large wheel speed difference between the left and right rear wheels WRL and WRR for a long time period, it is possible to properly calculate the learned value RDRG of the different tire diameter ratio while eliminating the influence of a disturbance, as described above.

It should be noted that the present invention is by no means limited to the embodiment described above, but it can be practiced in various forms. For example, although in the above-described embodiment, the different tire diameter ratio RDR, which is a ratio between the rotational speeds of the left rear wheel WRL and the right rear wheel WRR, is used as the variation parameter, this is not limitative, but the difference in rotational speed between the left and right rear wheels WRL and WRR may be used as the variation parameter. Further, although in the above-described embodiment, the left rear wheel WRL and the right rear wheel WRR are used as the reference wheel and another wheel, respectively, this is not limitative, but inversely, the right rear wheel WRR and the left rear wheel WRL may be used as the reference wheel and another wheel, respectively. Furthermore, although in the above-described embodiment, relative variation in diameter between the tires of the left and right rear wheels WRL and WRR is detected, relative variation in diameter between the tires of the left and right front wheels WFL and WFR may be detected, or relative variation in diameter between the tire of one of the left and right front wheels WFL and WFR and the tire of one of the left and right rear wheels WRL and WRR may be detected. Further, although the travelled distance cumulative value DISSUM, which represents a travelled distance of the vehicle V, is calculated based on the left and right rear wheel rotational speeds NRL and NRR, this is not limitative, but the travelled distance cumulative value DISSUM may be calculated based on the wheel speeds NFL, NFR, NRL and NRR of the respective left and right front and rear wheels, or may be calculated based on the engine speed NE or the transmission ratio of the automatic transmission 4.

Furthermore, the method of learning the different tire diameter ratio RDR between tires is not limited to the method employed in the above-described embodiment, but any other suitable method may be used. For example, the following method may be employed: The different tire diameter ratio difference DG is calculated by subtracting a predetermined reference value RDRB (e.g. 1.0) from the different tire diameter ratio RDR. Then, similarly to the above-described embodiment, the second difference cumulative value DGSUM2 is calculated, and is added to the above reference value RDRB, to thereby calculate the provisional value RDRGT. Then, similarly to the above-described embodiment, the learned value RDRG of the different tire diameter ratio is obtained using the calculated provisional value RDRGT. Alternatively, the learned value RDRG is calculated by averaging a plurality of values of the different diameter ratio RDR which are obtained before the travelled distance of the vehicle V has reached the second predetermined distance DIS2.

Further, although in the above-described embodiment, the present invention is applied to a four-wheel vehicle, by way of example, this is not limitative, but the present invention may be applied to any arbitrary vehicle insofar as the vehicle is provided with at least two wheels that rotate independently of each other. It is to be further understood that various changes and modifications may be made without departing from the spirit and scope thereof.

INDUSTRIAL APPLICABILITY

The wheel diameter variation-detecting device according to the present invention is very useful in properly detecting relative variation in diameter between a plurality of wheels of a vehicle.

The invention claimed is:

1. A wheel diameter variation-detecting device for detecting variation in diameter between a plurality of wheels of a vehicle, the wheels rotating independently of each other, comprising:
   wheel rotational speed sensors that detect rotational speeds of the wheels, respectively;
   variation parameter-calculating means for calculating a variation parameter indicative of variation in diameter between the wheels, using one of the wheels as a reference wheel, based on a result of comparison between a detected rotational speed of the reference wheel and a detected rotational speed of another wheel;
   travelled distance-detecting means for detecting a travelled distance of the vehicle;
   variation parameter-learning means for determining a provisional value of a learned value of the variation parameter by averaging a plurality of values of the variation parameter obtained before the detected travelled distance reaches a predetermined distance, and repeating the averaging to obtain the learned value of the variation parameter; and
   storage means for storing the determined provisional value of the learned value and the learned value of the variation parameter,
   wherein said variation parameter-learning means updates the learned value to an average value of the determined provisional value of the learned value, the stored latest value of the learned value, and the immediately preceding value of the learned value when an absolute value of a difference between the provisional value of the learned value and the stored latest value of the learned value is smaller than a first predetermined value, and
   defers an update of the learned value when the absolute value of the difference between the provisional value of the learned value and the latest value of the learned value is equal to or larger than the first predetermined value and at the same time an absolute value of a difference between the provisional value of the learned value and the stored immediately preceding value of the provisional value of the learned value is equal to or larger than a second predetermined value,
   wherein said first predetermined value is a parameter for judging whether reliabilities of the provisional value of the learned value and the learned value are high,
   wherein said second predetermined value is a parameter for judging whether reliabilities of the provisional value of the learned value and the immediately preceding value of the provisional value of the learned value are high,
   wherein said variation parameter-learning means determines whether to permit or inhibit a cornering control of the vehicle based on the reliabilities of the provisional value of the learned value and the learned value, and based on the reliabilities of the provisional value of the learned value and the immediately preceding value of the provisional value of the learned value, and
   wherein the wheel diameter variation-detecting device further comprises control means for applying the cornering control of the vehicle to the vehicle based on the determination of the variation parameter-learning means.

2. A wheel diameter variation-detecting device as claimed in claim 1, wherein the variation parameter is related to a ratio between the rotational speed of the reference wheel and the rotational speed of the another wheel.

3. A wheel diameter variation-detecting device as claimed in claim 2, wherein the wheels include left and right wheels, and
   wherein the reference wheel is one of the left and right wheels and the another wheel is the other of the left and right wheels.

4. A wheel diameter variation-detecting device as claimed in claim 1, wherein the wheels include left and right wheels, and
   wherein the reference wheel is one of the left and right wheels and the another wheel is the other of the left and right wheels.

5. A wheel diameter variation-detecting device as claimed in claim 1, wherein, prior to determining of the provisional value of the learned value, the cornering control of the vehicle is prohibited.

* * * * *